(12) United States Patent
Celiesius

(10) Patent No.: US 11,838,148 B2
(45) Date of Patent: *Dec. 5, 2023

(54) PROVIDING A SPLIT-CONFIGURATION VIRTUAL PRIVATE NETWORK

(71) Applicant: OVERSEC, UAB, Vilnius (LT)

(72) Inventor: Kazimieras Celiesius, Vilnius (LT)

(73) Assignee: Oversec, UAB, Vilnius (LT)

( * ) Notice: Subject to any disclaimer, the term of this patent is extended or adjusted under 35 U.S.C. 154(b) by 0 days.

This patent is subject to a terminal disclaimer.

(21) Appl. No.: 17/959,217

(22) Filed: Oct. 3, 2022

(65) Prior Publication Data

US 2023/0038160 A1 Feb. 9, 2023

Related U.S. Application Data

(63) Continuation of application No. 17/392,631, filed on Aug. 3, 2021, now Pat. No. 11,489,808.

(51) Int. Cl.
*H04L 12/46* (2006.01)
*H04L 61/4511* (2022.01)

(52) U.S. Cl.
CPC ...... *H04L 12/4641* (2013.01); *H04L 61/4511* (2022.05)

(58) Field of Classification Search
CPC .............. H04L 12/4641; H04L 61/4511
See application file for complete search history.

(56) References Cited

U.S. PATENT DOCUMENTS

| | | |
|---|---|---|
| 7,970,765 B1 | 6/2011 | Olsen et al. |
| 8,156,199 B1 | 4/2012 | Mong et al. |
| 8,776,209 B1 | 7/2014 | Kumar et al. |
| 10,243,922 B2 | 3/2019 | Bifulco et al. |
| 10,257,167 B1 | 4/2019 | Matthews et al. |
| 10,355,989 B1 | 7/2019 | Panchal et al. |
| 10,374,953 B1 | 8/2019 | Branch et al. |
| 10,511,630 B1 | 12/2019 | Weiss et al. |
| 10,601,779 B1 | 3/2020 | Matthews et al. |
| 10,911,407 B1 | 2/2021 | Warburton et al. |
| 10,972,427 B1 | 4/2021 | Hu |
| 10,972,587 B1 | 4/2021 | Delaney et al. |
| 11,190,491 B1 | 11/2021 | Kaciulis et al. |
| 11,310,146 B1 | 4/2022 | Kaciulis et al. |

(Continued)

FOREIGN PATENT DOCUMENTS

WO WO2015162450 A1 10/2015

*Primary Examiner* — Blake J Rubin
(74) *Attorney, Agent, or Firm* — The Pattani Law Group

(57) ABSTRACT

A method associated with a split-configuration virtual private network (VPN), the method including receiving, by a VPN server from a user device prior to establishment of a VPN connection between the VPN server and the user device, an initiation request to establish the VPN connection, the initiation request including remote content information indicating remote content that is to be requested by the user device after the VPN connection is established, the remote content being unavailable in a geographic location of the user device; and configuring, by the VPN server based at least in part on the remote content information, domain name services (DNS) settings associated with the VPN connection to associate the VPN connection with a remote DNS server that is capable of enabling the VPN server to obtain the remote content after establishment of the VPN connection is disclosed. Various other aspects are contemplated.

20 Claims, 7 Drawing Sheets

(56) References Cited

U.S. PATENT DOCUMENTS

| | | |
|---|---|---|
| 11,363,062 B1 | 6/2022 | Celiesius |
| 2011/0107414 A1 | 5/2011 | Diab et al. |
| 2012/0023570 A1 | 1/2012 | Gorodyansky |
| 2014/0344917 A1 | 11/2014 | Parla et al. |
| 2015/0188949 A1 | 7/2015 | Mahaffey et al. |
| 2015/0295888 A1 | 10/2015 | Maslak |
| 2015/0295892 A1 | 10/2015 | Fox |
| 2016/0261564 A1 | 9/2016 | Foxhoven et al. |
| 2016/0308762 A1 | 10/2016 | Teng et al. |
| 2016/0337104 A1 | 11/2016 | Kalligudd |
| 2017/0012937 A1 | 1/2017 | Dinha et al. |
| 2017/0054758 A1 | 2/2017 | Maino et al. |
| 2017/0064749 A1 | 3/2017 | Jain et al. |
| 2017/0098219 A1 | 4/2017 | Peram et al. |
| 2017/0237735 A1 | 8/2017 | Johnson et al. |
| 2018/0054420 A1 | 2/2018 | Mindte |
| 2018/0131719 A1 | 5/2018 | Amit et al. |
| 2018/0145950 A1 | 5/2018 | Tabares |
| 2018/0270201 A1 | 9/2018 | Chanak et al. |
| 2018/0309658 A1 | 10/2018 | Parla et al. |
| 2019/0036871 A1 | 1/2019 | Lapidous et al. |
| 2019/0075168 A1 | 3/2019 | Goldfarb et al. |
| 2019/0173849 A1 | 6/2019 | Lapidous et al. |
| 2020/0162431 A1 | 5/2020 | Goldschlag et al. |
| 2020/0213192 A1 | 7/2020 | Anderson et al. |
| 2020/0259795 A1 | 8/2020 | Koshal et al. |
| 2020/0314067 A1 | 10/2020 | Rudnik |
| 2020/0329048 A1 | 10/2020 | Bhattacharya et al. |
| 2020/0336409 A1 | 10/2020 | Branch |
| 2020/0344084 A1 | 10/2020 | Shribman et al. |
| 2021/0021565 A1 | 1/2021 | Chand et al. |
| 2021/0234860 A1 | 7/2021 | Bansal et al. |
| 2021/0314301 A1 | 10/2021 | Chanak et al. |
| 2021/0320871 A1 | 10/2021 | Savarese et al. |
| 2021/0328832 A1 | 10/2021 | Norbutas et al. |
| 2021/0336931 A1 | 10/2021 | Lutz et al. |
| 2021/0344651 A1 | 11/2021 | Joshi et al. |
| 2021/0392076 A1 | 12/2021 | Prodoehl et al. |
| 2022/0103523 A1 | 3/2022 | Starr et al. |
| 2022/0116273 A1 | 4/2022 | Cunningham et al. |
| 2022/0124071 A1 | 4/2022 | Wright et al. |

PROVIDING A SPLIT-CONFIGURATION VIRTUAL PRIVATE NETWORK

CROSS REFERENCE

This application is a continuation of U.S. Non-Provisional patent application Ser. No. 17/392,631, filed on Aug. 3, 2021, and titled "Providing a Split-Configuration Virtual Private Network," the entire contents of which are incorporated herein by reference.

FIELD OF DISCLOSURE

Aspects of the present disclosure generally relate to a virtual private network (VPN), and more particularly to providing a split-configuration VPN.

BACKGROUND

Global Internet users increasingly rely on VPN services to preserve their privacy, to circumvent censorship, and/or to access geo-filtered content. Originally developed as a technology to privately send and receive data across public networks, VPNs are now used broadly as a privacy-preserving technology that allows Internet users to obscure not only the communicated data but also personal information such as, for example, web browsing history from third parties including Internet service providers (ISPs), Spywares, or the like. A VPN service provider may offer a secure private networking environment within a publicly shared, insecure infrastructure through encapsulation and encryption of the data communicated between a VPN client application (or VPN application) installed on a user device and a remote VPN server.

Most VPN providers rely on a tunneling protocol to create the secure private networking environment, which adds a layer of security to protect each IP packet of the communicated data during communication over the Internet. Tunneling may be associated with enclosing an entire IP packet within an outer IP packet to form an encapsulated IP packet, and transporting the enclosed IP packet over the Internet. The outer IP packet may protect contents of the enclosed IP packet from public view by ensuring that the enclosed IP packet is transmitted over the Internet within a virtual tunnel. Such a virtual tunnel may be a point-to-point tunnel established between the user device and the VPN server. The process of enclosing the entire IP packet within the outer IP packet may be referred to as encapsulation. Computers, servers, or other network devices at ends of the virtual tunnel may be referred to as tunnel interfaces and may be capable of encapsulating outgoing IP packets and of unwrapping incoming encapsulated IP packets.

Encryption may be associated with changing the data from being in a transparently readable format to being in an encoded, unreadable format with help of an encryption algorithm. Decryption may be associated with changing the data from being in the encoded, unreadable format to being in the transparently readable format with help of a decryption algorithm. In an example, encoded/encrypted data may be decoded/decrypted with only a correct decryption key. In a VPN, encryption may render the communicated data unreadable or indecipherable to any third party. At a basic level, when the user launches the installed VPN application and connects to the VPN server, the VPN application may encrypt all contents of the data before transmission over the Internet to the VPN server. Upon receipt, the VPN server may decrypt the encrypted data and forward the decrypted data to an intended target via the Internet. Similarly, the VPN server may encrypt all contents of the data before transmission over the Internet to the user device. Upon receipt, the VPN application on the user device may decrypt the encrypted data and provide the decrypted data to the user.

VPNs generally use different types of encryption and decryption algorithms to encrypt and decrypt the communicated data. Symmetric encryption may utilize encryption and decryption algorithms that rely on a single private key for encryption and decryption of data. Symmetric encryption is considered to be relatively speedy. One example of an encryption and decryption algorithm utilized by symmetric encryption may be an AES encryption cipher. Asymmetric encryption, on the other hand, may utilize encryption and decryption algorithms that rely on two separate but mathematically-related keys for encryption and decryption of data. In one example, data encrypted using a public key may be decrypted using a separate but mathematically-related private key. The public key may be publicly available through a directory, while the private key may remain confidential and accessible by only an owner of the private key. Asymmetric encryption may also be referred to as public key cryptography. One example of an encryption and decryption algorithm utilized by asymmetric encryption may be Rivest-Shamir-Adleman (RSA) protocol.

In a VPN, keys for encryption and decryption may be randomly generated strings of bits. Each key may be generated to be unique. A length of an encryption key may be given by a number of the randomly generated string bits, and the longer the length of the encryption key, the stronger is the encryption.

VPNs may employ user authentication, which may involve verification of credentials required to confirm authenticity/identity of the user. For instance, when a user launches the VPN application to request a VPN connection, the VPN service provider may authenticate the user device prior to providing the user device with access to VPN services. In this way, user authentication may provide a form of access control. Typically, user authentication may include verification of a unique combination of a user ID and password. To provide improved security in the VPN, user authentication may include additional factors such as knowledge, possession, inheritance, or the like. Knowledge factors may include items (e.g., pin numbers) that an authentic user may be expected to know. Possession factors may include items (e.g., one-time password (OTP) tokens) that an authentic user may be expected to possess at a time associated with the authentication. Inherent factors may include biometric items (e.g., fingerprint scans, retina scans, iris scans, or the like) that may be inherent traits of an authentic user.

A VPN may be associated with a network of VPN servers, typically deployed in various geographic locations. A VPN server may be a physical server or a virtual server configured to host and/or globally deliver VPN services to the user. A server may be a combination of hardware and software, and may include logical and physical communication ports. When launched, the VPN application may connect with a selected VPN server for secure communication of data via the virtual tunnel.

The VPN application, installed on the user device, may utilize software-based technology to establish a secure connection between the user device and a VPN server. Some VPN applications may automatically work in the background on the user device while other VPN applications may include front-end interfaces to allow the user to interact with and configure the VPN applications. VPN applications may often be installed on a computer (e.g., user device), though some entities may provide a purpose-built VPN application as a hardware device that is pre-installed with software to enable the VPN. Typically, a VPN application may utilize one or more VPN protocols to encrypt and decrypt the communicated data. Some commonly used VPN protocols may include OpenVPN, SSTP, PPTP, L2TP/IPsec, SSL/TLS, Wireguard, IKEv2, and SoftEther.

SUMMARY

In one aspect, the present disclosure contemplates a method for providing a split-configuration virtual private network (VPN), the method including receiving, at a VPN server, an initiation request from a user device to establish a VPN connection with the VPN server, the initiation request including remote content information associated with remote content; and transmitting at least a portion of the remote content information to a remote domain name services (DNS) server to receive an access internet protocol (IP) address associated with a first exchange point that is capable of obtaining the remote content.

In another aspect, the present disclosure contemplates a device associated with a VPN, the device including a memory and a processor configured to: receive, at a VPN server, an initiation request from a user device to establish a VPN connection with the VPN server, the initiation request including remote content information associated with remote content; and transmit at least a portion of the remote content information to a remote domain name services (DNS) server to receive an access internet protocol (IP) address associated with a first exchange point that is capable of obtaining the remote content.

In another aspect, the present disclosure contemplates a non-transitory computer readable medium storing instructions, which when executed by a processor cause the processor to: receive, at a VPN server, an initiation request from a user device to establish a VPN connection with the VPN server, the initiation request including remote content information associated with remote content; and transmit at least a portion of the remote content information to a remote domain name services (DNS) server to receive an access internet protocol (IP) address associated with a first exchange point that is capable of obtaining the remote content.

It is to be understood that both the foregoing general description and the following detailed description are exemplary and explanatory in nature and are intended to provide an understanding of the present disclosure without limiting the scope thereof. In that regard, additional aspects, features, and advantages of the present disclosure will be apparent to one skilled in the art from the following detailed description.

BRIEF DESCRIPTION OF THE DRAWINGS

The accompanying drawings illustrate aspects of systems, devices, methods, and/or mediums disclosed herein and together with the description, serve to explain the principles of the present disclosure. Throughout this description, like elements, in whatever aspect described, refer to common elements wherever referred to and referenced by the same reference number. The characteristics, attributes, functions, interrelations ascribed to a particular element in one location apply to those elements when referred to by the same reference number in another location unless specifically stated otherwise.

The figures referenced below are drawn for ease of explanation of the basic teachings of the present disclosure; the extensions of the figures with respect to number, position, relationship, and dimensions of the parts to form the following aspects may be explained or may be within the skill of the art after the following description has been read and understood. Further, exact dimensions and dimensional proportions to conform to specific force, weight, strength, and similar requirements will likewise be within the skill of the art after the following description has been read and understood.

The following is a brief description of each figure used to describe the present disclosure, and thus, is being presented for illustrative purposes only and should not be limitative of the scope of the present disclosure.

Figure 1:
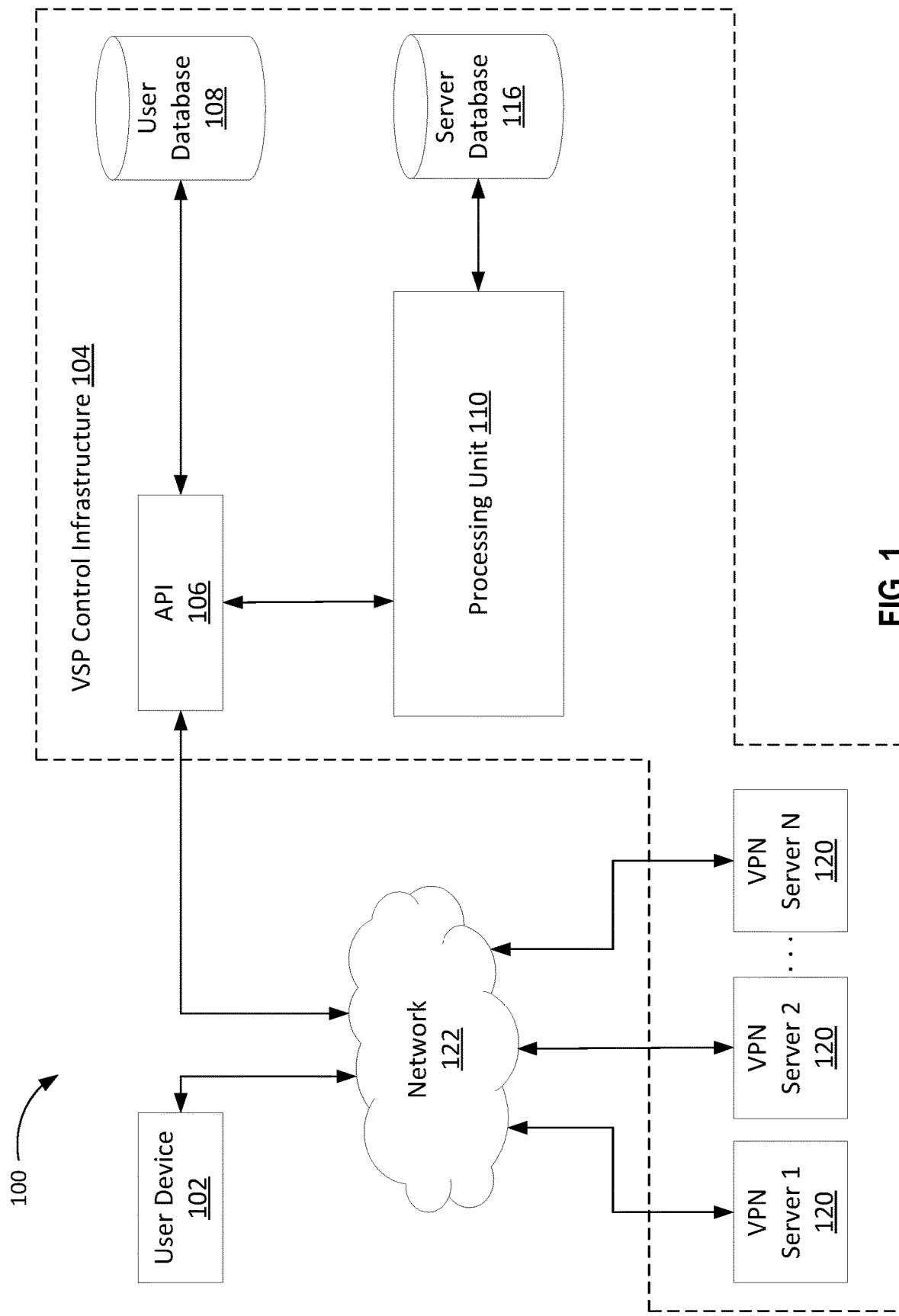

FIG. 1 is an illustration of an example system associated with providing a split-configuration VPN, according to various aspects of the present disclosure.

Figure 2:
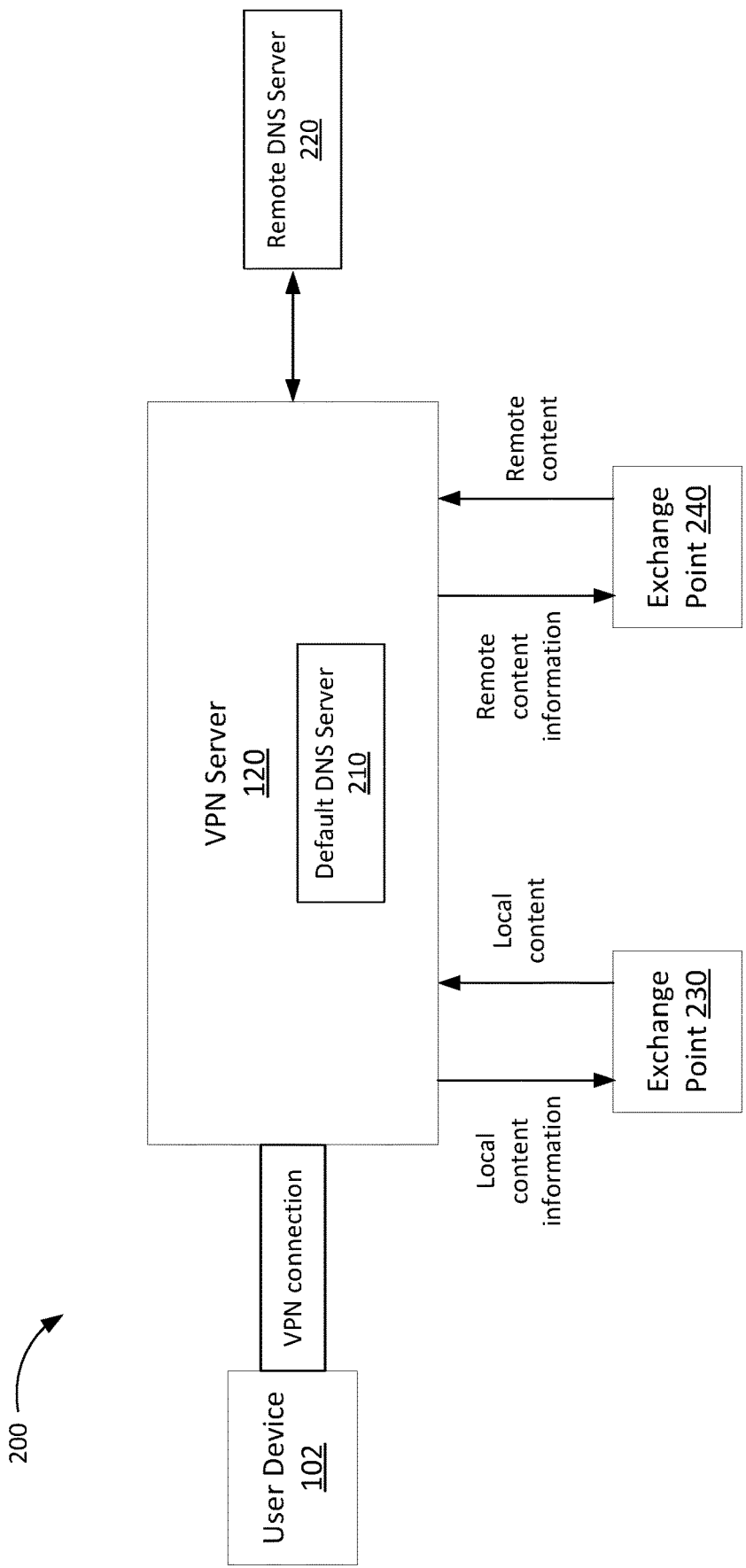

FIG. 2 is an illustration of an example system associated with providing a split-configuration VPN, according to various aspects of the present disclosure.

Figure 3:
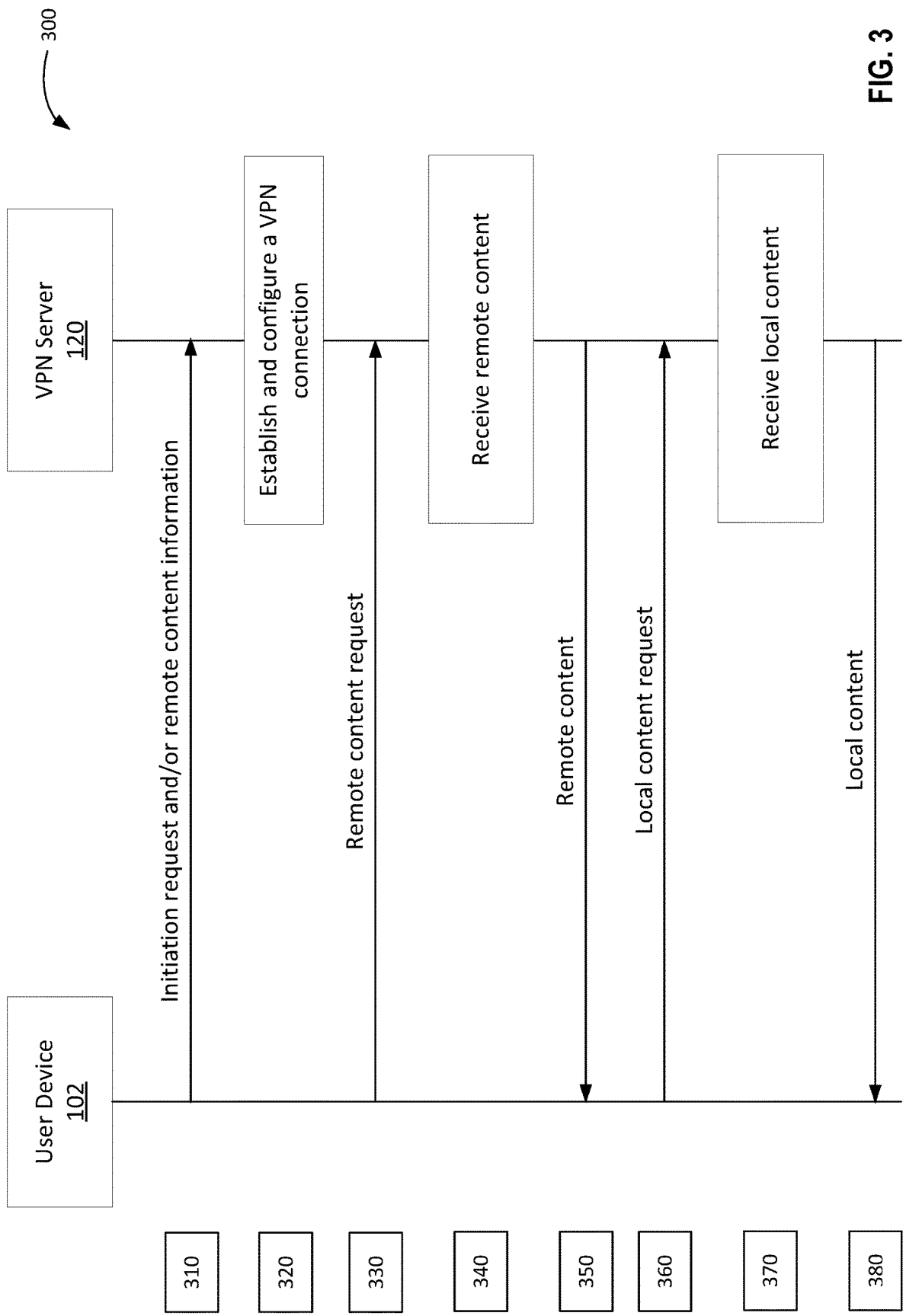

FIG. 3 is an illustration of an example flow associated with providing a split-configuration VPN, according to various aspects of the present disclosure.

Figure 4:
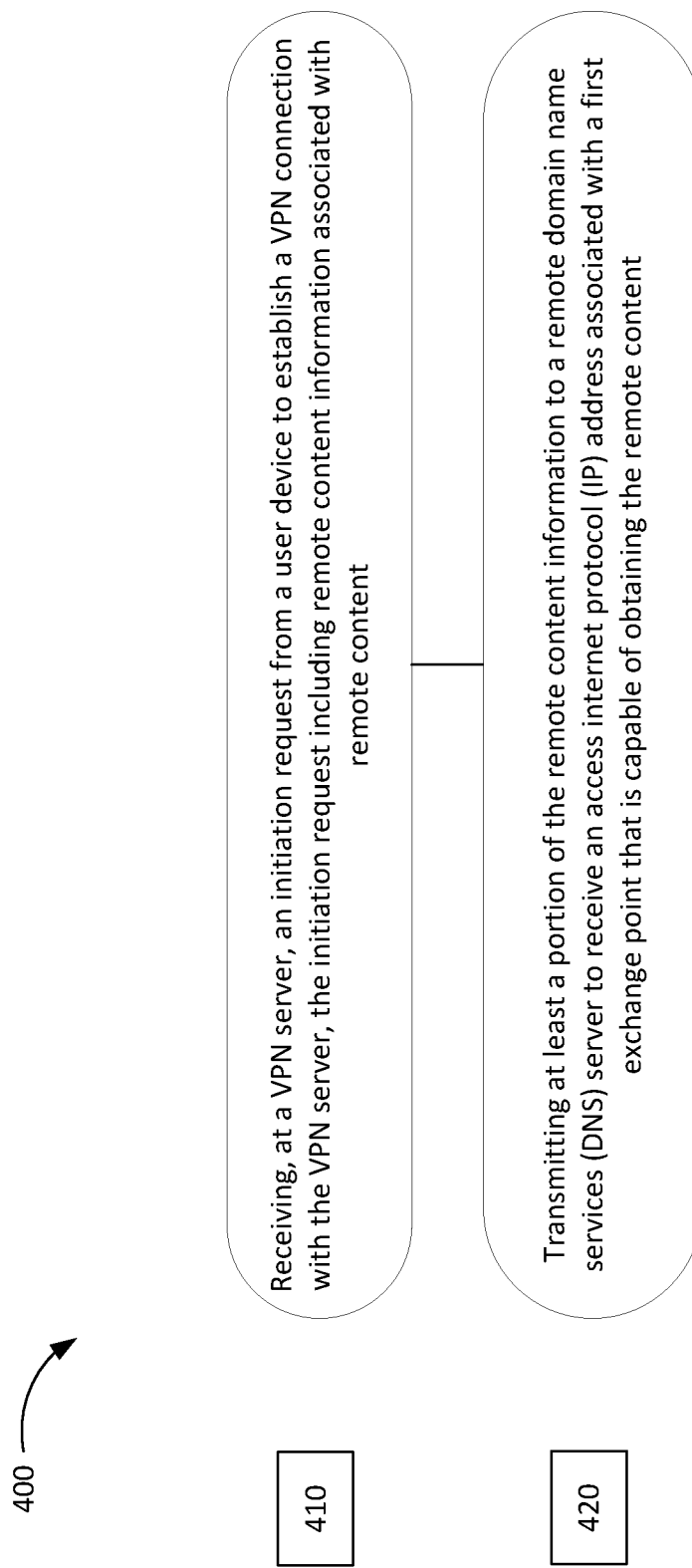

FIG. 4 is an illustration of an example process associated with providing a split-configuration VPN, according to various aspects of the present disclosure.

Figure 5:
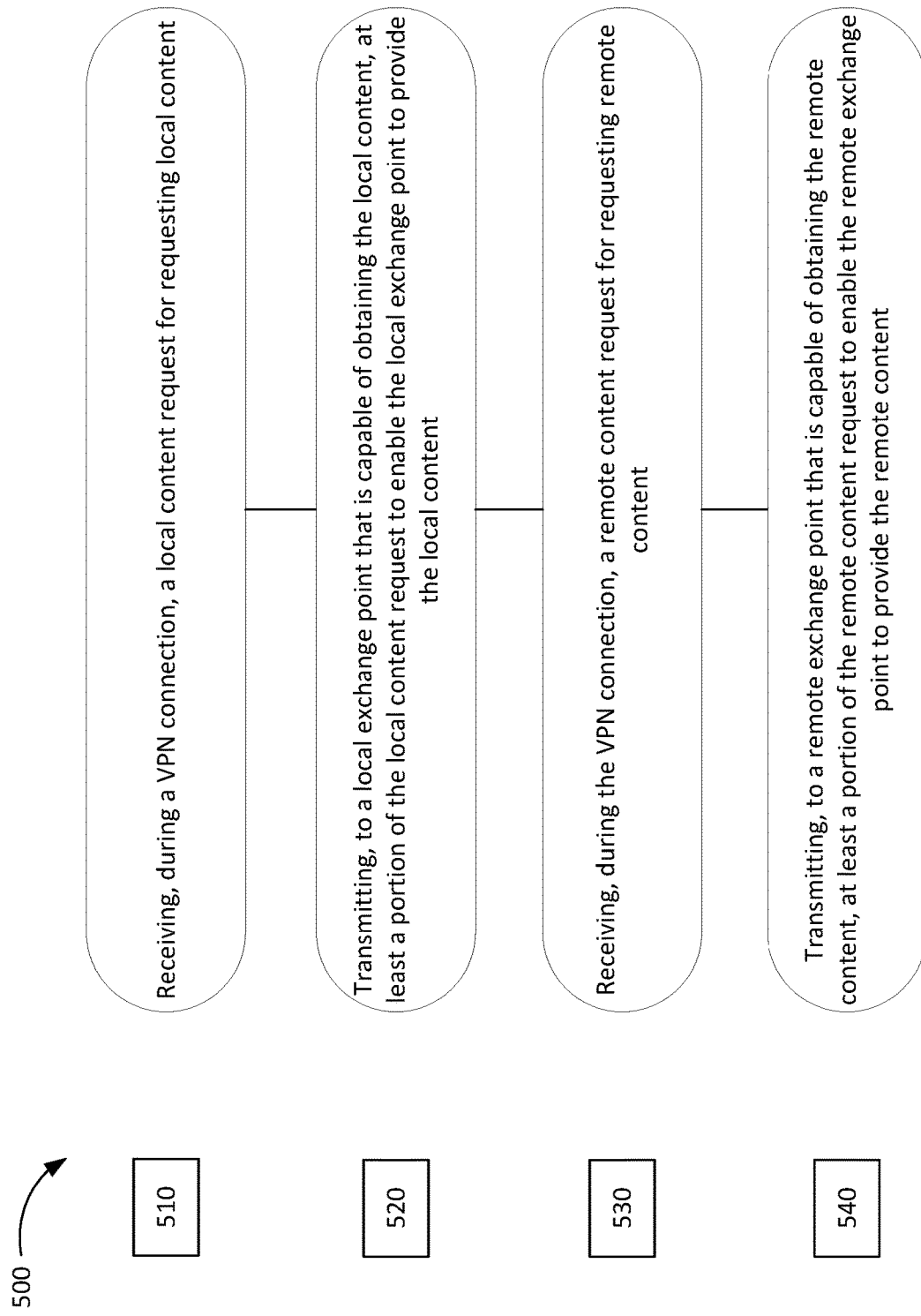
Figure 6:
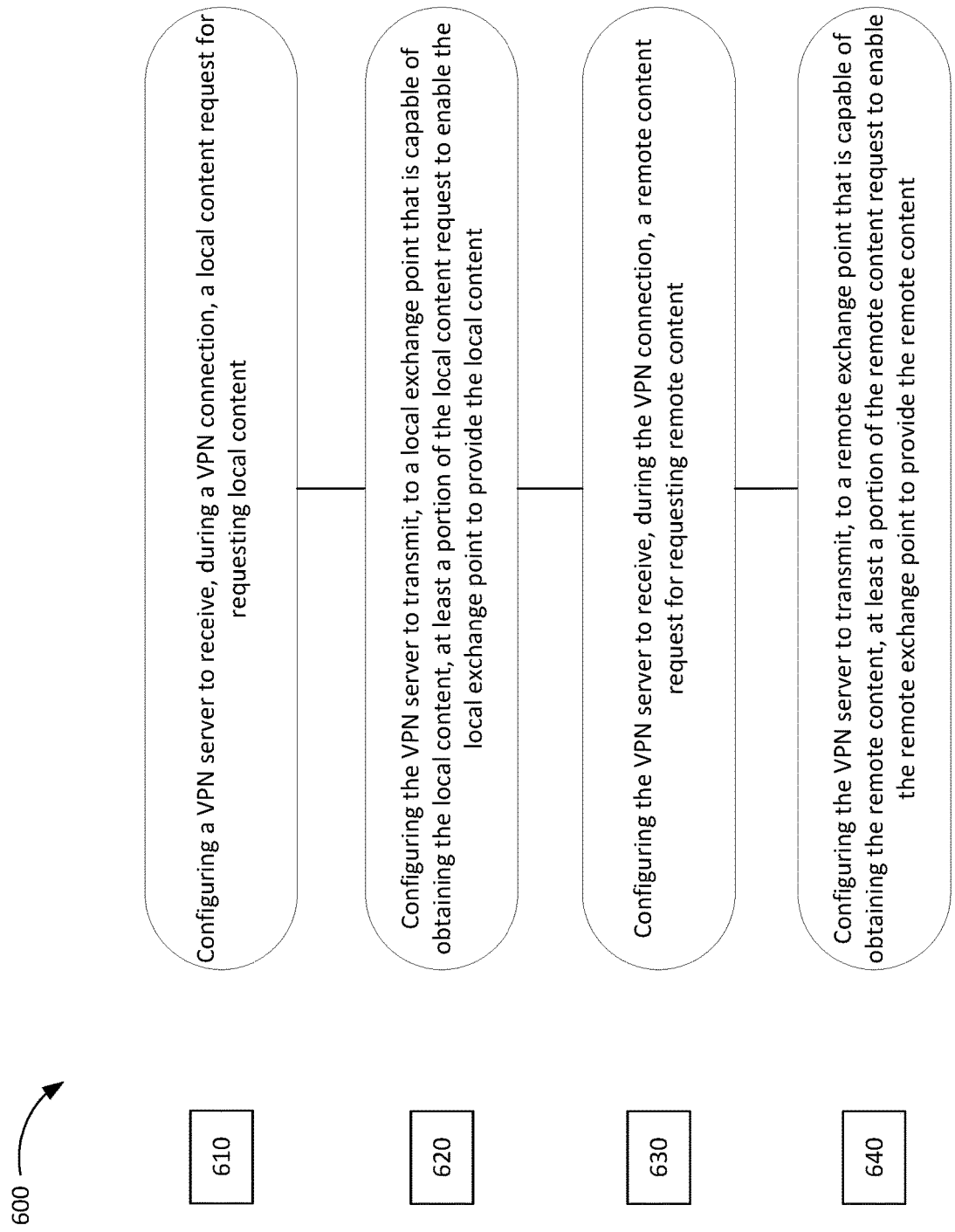
Figure 7:
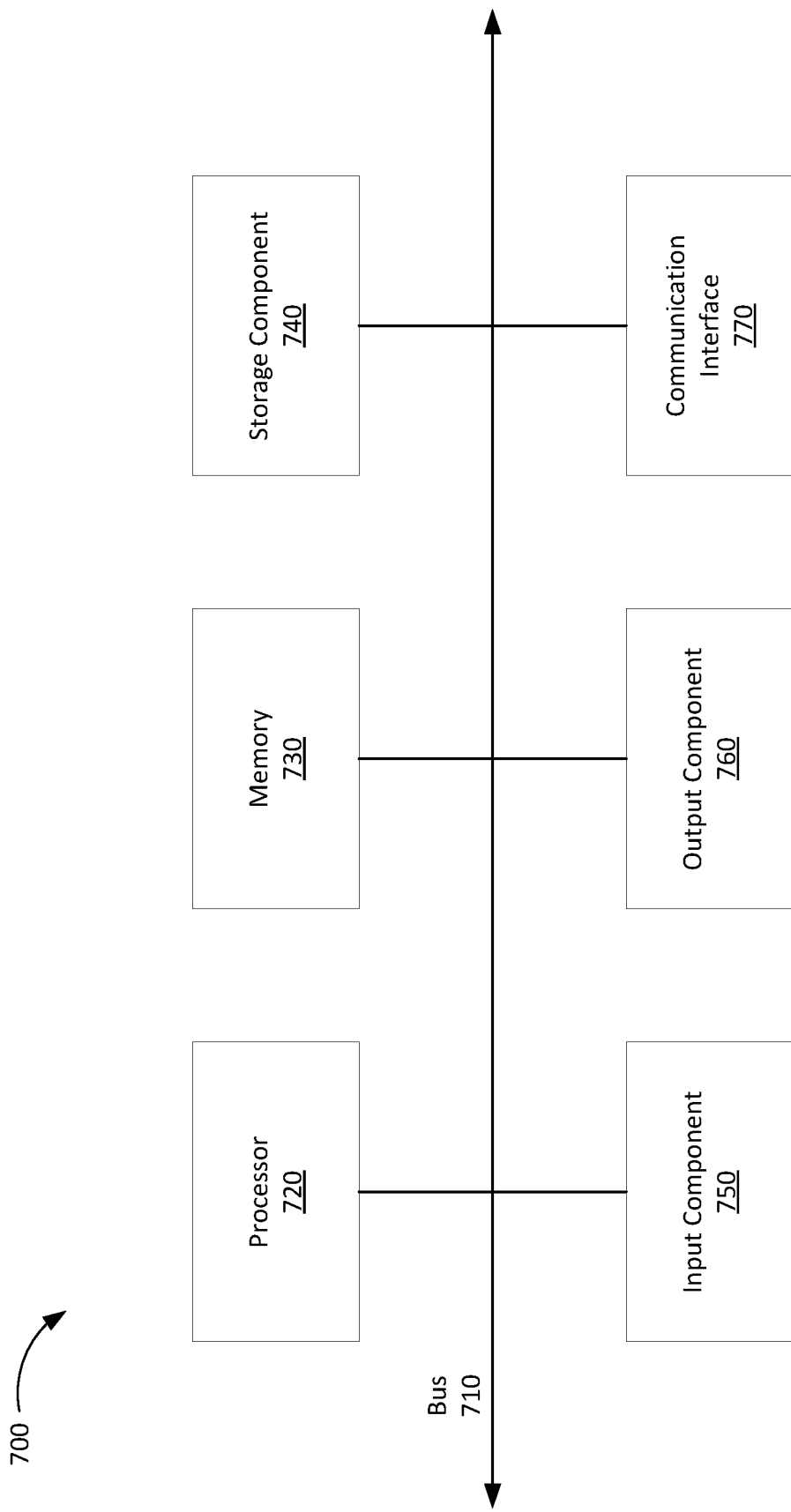

FIG. 5 is an illustration of an example process associated with providing a split-configuration VPN, according to various aspects of the present disclosure FIG. 6 is an illustration of an example process associated with providing a split-configuration VPN, according to various aspects of the present disclosure FIG. 7 is an illustration of example devices associated with providing a split-configuration VPN, according to various aspects of the present disclosure.

DETAILED DESCRIPTION

For the purposes of promoting an understanding of the principles of the present disclosure, reference will now be made to the aspects illustrated in the drawings, and specific language may be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one aspect may be combined with the features, components, and/or steps described with respect to other aspects of the present disclosure. For the sake of brevity, however, the numerous iterations of these combinations may not be described separately. For simplicity, in some instances the same reference numbers are used throughout the drawings to refer to the same or like parts.

FIG. 1 is an illustration of an example system 100 associated with rotating exit IP addresses in a VPN, according to various aspects of the present disclosure. Example 100 shows an architectural depiction of components included in system 100. In some aspects, the components may include a user device 102 capable of communicating with one or more VPN servers 120 and with a VPN service provider (VSP) control infrastructure 104 over a network 122. The VSP control infrastructure 104 may be controlled by a VPN service provider and may include an application programming interface (API) 106, a user database 108, processing unit 110, a server database 116, and the one or more VPN servers 120. As shown in FIG. 1, the API 106 may be capable of communicating with the user database 108 and with the processing unit 110. Additionally, the processing unit 110 may be capable of communicating with the server database, which may be capable of communicating with a testing module (not shown). The testing module may be capable of communicating with the one or more VPN servers 120 over the network 122. The processing unit 110 may be capable of controlling operation of the one or more VPN servers 120.

The user device 102 may be a physical computing device capable of hosting a VPN application and of connecting to the network 122. The user device 102 may be, for example, a laptop, a mobile phone, a tablet computer, a desktop computer, a smart device, a router, or the like. In some aspects, the user device 102 may include, for example, Internet-of-Things (IoT) devices such as VSP smart home appliances, smart home security systems, autonomous vehicles, smart health monitors, smart factory equipment, wireless inventory trackers, biometric cyber security scanners, or the like. The network 122 may be any digital telecommunication network that permits several nodes to share and access resources. In some aspects, the network 122 may include one or more of, for example, a local-area network (LAN), a wide-area network (WAN), a campus-area network (CAN), a metropolitan-area network (MAN), a home-area network (HAN), Internet, Intranet, Extranet, and Internetwork.

The VSP control infrastructure 104 may include a combination of hardware and software components that enable provision of VPN services to the user device 102. The VSP control infrastructure 104 may interface with (the VPN application on) the user device 102 via the API 106, which may include one or more endpoints to a defined request-response message system. In some aspects, the API 106 may be configured to receive, via the network 122, a connection request from the user device 102 to establish a VPN connection with a VPN server 120. The connection request may include an authentication request to authenticate the user device 102 and/or a request for an IP address of an optimal VPN server for establishment of the VPN connection therewith. In some aspects, an optimal VPN server may be a single VPN server 120 or a combination of one or more VPN servers 120. The API 106 may receive the authentication request and the request for an IP address of an optimal VPN server in a single connection request. In some aspects, the API 106 may receive the authentication request and the request for an IP address of an optimal VPN server in separate connection requests.

The API 106 may further be configured to handle the connection request by mediating the authentication request. For instance, the API 106 may receive from the user device 102 credentials including, for example, a unique combination of a user ID and password for purposes of authenticating the user device 102. In another example, the credentials may include a unique validation code known to an authentic user. The API 106 may provide the received credentials to the user database 108 for verification.

The user database 108 may include a structured repository of valid credentials belonging to authentic users. In one example, the structured repository may include one or more tables containing valid unique combinations of user IDs and passwords belonging to authentic users. In another example, the structured repository may include one or more tables containing valid unique validation codes associated with authentic users. The VPN service provider may add or delete such valid unique combinations of user IDs and passwords from the structured repository at any time. Based at least in part on receiving the credentials from the API 106, the user database 108 and a processor (e.g., the processing unit 110 or another local or remote processor) may verify the received credentials by matching the received credentials with the valid credentials stored in the structured repository. In some aspects, the user database 108 and the processor may authenticate the user device 102 when the received credentials match at least one of the valid credentials. In this case, the VPN service provider may provide VPN services to the user device 102. When the received credentials fail to match at least one of the valid credentials, the user database 108 and the processor may fail to authenticate the user device 102. In this case, the VPN service provider may decline to provide VPN services to the user device 102.

When the user device 102 is authenticated, the user device 102 may initiate a VPN connection and may transmit to the API 106 a request for an IP address of an optimal VPN server. The processing unit 110 included in the VSP control infrastructure may be configured to determine/identify a single VPN server 120 as the optimal server or a list of VPN servers. The processing unit 110 may utilize the API 106 to transmit the IP address of the optimal server or IP addresses of the VPN servers 120 included in the list to the user device 102. In the case where the list of IP addresses of the VPN servers 120 is provided, the user device 102 may have an option to select a single VPN server 120 from among the listed VPN servers as the optimal server 120. The user device 102 may transmit an initiation request to establish a VPN connection (e.g., an encrypted tunnel) with the optimal VPN server. In some aspects, the optimal VPN server with which the user device establishes the encrypted tunnel may be referred to as a primary VPN server or an entry VPN server. In some aspects, a VPN server 120 may be a piece of physical or virtual computer hardware and/or software capable of securely communicating with (the VPN application on) the user device 102 for provision of VPN services.

The processing unit 110 may be a logical unit including a scoring engine 112. The processing unit 110 may include a logical component configured to perform complex operations to compute numerical weights related to various factors associated with the VPN servers 120. The scoring engine may likewise include a logical component configured to perform arithmetical and logical operations to compute a server penalty score for one or more of the VPN servers 120.

In some aspects, based at least in part on server penalty scores calculated via the complex operations and/or the arithmetical and logical operations, the processing unit 110 may determine an optimal VPN server. In one example, the processing unit 110 may determine the VPN server 120 with the lowest server penalty score as the optimal VPN server. In another example, the processing unit 110 may determine the list of optimal VPN servers by including, for example, three (or any other number) VPN servers 120 with the three lowest server penalty scores.

One or more components (e.g., API 106, user database 108, processing unit 110, and/or server database 116) included in the VSP control infrastructure 104 may further be associated with a controller/processor, a memory, or a combination thereof. For instance, the one or more components of the set of components may include or may be included in a controller/processor, a memory, or a combination thereof. In some aspects, the one or more of the components included in the VSP control infrastructure 104 may be separate and distinct from each other. Alternatively, in some aspects, one or more of the components included in the VSP control infrastructure 104 may be combined with one or more of other components included in the VSP control infrastructure 104. In some aspects, the one or more of the components included in the VSP control infrastructure 104 may be local with respect to each other. Alternatively, in some aspects, one or more of the components included in the VSP control infrastructure 104 may be located remotely with respect to one or more of other components included in the VSP control infrastructure 104. Additionally, or alternatively, one or more components of the components included in the VSP control infrastructure 104 may be implemented at least in part as software stored in a memory. For example, a component (or a portion of a component) may be implemented as instructions or code stored in a non-transitory computer-readable medium and executable by a controller or a processor to perform the functions or operations of the component. Additionally, or alternatively, a set of (one or more) components shown in FIG. 1 may be configured to perform one or more functions described as being performed by another set of components shown in FIG. 1.

As indicated above, FIG. 1 is provided as an example. Other examples may differ from what is described with regard to FIG. 1.

A user device may receive remote content via a VPN network. Remote content may include content that is unavailable in a geographic location where the user device is located. Remote content may also include multimedia content such as audio content, video content, audio-video content, image content, or the like and/or non-multimedia content such as textual data, textual information, or the like. The user device may receive the remote multimedia content via streaming, which may include real-time reception and rendering of the remote multimedia content on the user device.

To receive the remote content via the VPN network, the user device may request VPN services from a VSP control infrastructure. The VSP control infrastructure may suggest a VPN server for providing VPN services to the user device. The VPN server may be an optimal VPN server for providing VPN services to the user device because, for example, the VPN server may be located geographically/physically closer (and therefore able to provide speedier service) to the user device as compared to the other VPN servers. The user device may establish a VPN connection with the VPN server.

During the established VPN connection, the user device may transmit a remote content request for requesting the VPN server to provide the remote content. Based at least in part on receiving the remote content request, the VPN server may utilize an associated domain name services (DNS) server to reach an exchange point to obtain the remote content. The associated DNS server may be a default DNS server utilized by the VPN server to service all received requests (e.g., requests for remote content, requests for local content, or the like). In an example, the DNS server may be local to the VPN server and/or may be included within the VPN server, thereby enabling speedy DNS services to the VPN server.

The default DNS server may fail to enable the VPN server to reach an exchange point capable of obtaining the remote content. For instance, the default DNS server may be limited to providing an access Internet protocol (IP) address of an exchange point that is not be capable of obtaining the remote content. An exchange point may not be capable of obtaining the remote content because, for example, the exchange point is associated with a VPN server and/or the exchange point is located in a geographic location (which may be similar to a location of the VPN server and/or a location of the user device) where the remote content is unavailable. For instance, an exchange point may utilize a proxy IP address to obtain the remote content. A content provider of the remote content may decline to provide the remote content to the exchange point based on evaluating the proxy IP address and determining that the exchange point is associated with a VPN server. Additionally, or alternatively, the content provider may decline to provide the remote content to the exchange point based on evaluating the proxy IP address and determining that the exchange point is located in a geographical location where the remote content is unavailable. As a result, the DNS server may be unable to provide an access IP address of an exchange point capable of obtaining the remote content. Consequently, the VPN server may be unable to provide the remote content to the user device.

To receive the remote content, the user device may disconnect the established VPN connection with the VPN server and establish a new VPN connection with a new VPN server. The user device may select the new VPN server, from a list of VPN servers presented by the VSP control infrastructure, based on the new VPN server being associated with a default DNS server that is able to provide an access IP address of an exchange point capable of obtaining the remote content (e.g., located in a geographic location where the remote content is available).

Such new VPN server may be located at a threshold distance away from the user device. As a result, the VPN connection with the new VPN server may include a plurality of nodes and/or routers. For at least this reason, the new VPN server may be unable to provide the user device with speedy service, which may be essential for streaming remote multimedia content. The user device may be unable to adequately stream the remote multimedia content. Additionally, disconnecting the established VPN connection and establishing the new VPN connection may inefficiently consume user device resources (e.g., processing resources, memory resources, power consumption resources, battery life, or the like) and resources associated with the VPN (computational resources, network bandwidth, management resources, processing resources, memory resources, or the like) that can otherwise be used to perform suitable tasks associated with the VPN. Also, based on a threshold amount of user devices connecting to the new VPN server to receive the remote content, the new VPN server may become overloaded, thereby consuming the resources associated with the VPN that may otherwise be used for suitable tasks associated with the VPN.

Various aspects of systems and techniques discussed in the present disclosure enable providing a split-configuration VPN. In some aspects, providing a split-configuration may include a VSP control infrastructure configuring a VPN server to utilize a first DNS server to service remote content requests requesting remote content and a second DNS server (e.g., default DNS server) to service local content requests requesting local content. Local content may include content that is available in a geographic location where the user device (and/or the VPN server) is located. In some aspects, the VPN server may be configured to receive, from the user device, remote content information indicating parameters associated with the remote content. The VPN server may receive the remote content information along with an initiation request from the user device requesting to establish a VPN connection with the VPN server. Based at least in part on the remote content information, the VPN server may configure the VPN connection to be associated with one or more remote DNS servers that may enable the VPN server to reach an exchange point capable of obtaining the remote content. In some aspects, the exchange point may be capable of obtaining the remote content based at least in part on being located in a geographic location where the remote content is available. During the VPN connection, the VPN server may transmit at least a portion of the remote content information to enable the exchange point to obtain the remote content.

In this way, the VSP control infrastructure may configure the VPN server to receive the remote content and to provide the remote content to the user device without the user device disconnecting an established VPN connection with the VPN server and establishing a new VPN connection with a new VPN server. As a result, efficient consumption of user device resources and resources associated with the VPN may be enabled. Additionally, because the VPN server may be an optimal VPN server to provide VPN services to the user device, the user device may receive speedier service as compared to the new VPN server. Also, overloading of the new VPN server by users receiving the remote content may be avoided, thereby conserving resources associated with the VPN.

In some aspects, a processing unit (e.g., processing unit 110) included in the VSP control infrastructure may configure a VPN server to receive an initiation request from a user device to establish a VPN connection, the initiation request including remote content information associated with remote content; and to transmit at least a portion of the remote content information to a remote domain name services (DNS) server to enable the remote DNS server to provide an access internet protocol (IP) address associated with a first exchange point that is capable of obtaining the remote content.

FIG. 2 is an illustration of an example system 200 associated with providing a split-configuration VPN, according to various aspects of the present disclosure. The example system 200 may include a user device 102, a VPN server 120 associated with a default DNS server 210, one or more remote DNS servers 220, an exchange point 230, and an exchange point 240. The default DNS server 210 may be local to the VPN server 120 and/or may be included within the VPN server 120, thereby enabling speedy DNS services to the VPN server 120 with respect to obtaining local content. The one or more remote DNS servers 220 may be located remotely with respect to the VPN server 120 and may enable the VPN server 120 to obtain remote content. The VPN server 120 may be configured by a VSP control infrastructure (not shown) to provide VPN services to the user device 102. In some aspects, the exchange point 230 and the exchange point 240 may include, or may be included within, a proxy server.

The user device 102 may undergo an authentication process with a VSP control infrastructure (e.g., VSP control infrastructure) to receive VPN services via a VPN network. Such VPN services may include receiving remote content and receiving local content. Remote content may include content unavailable in a geographic location associated with the user device 102 and/or the VPN server 120. Local content may include content available in the geographic location associated with the user device 102 and/or the VPN server 120. Remote content may include remote multimedia content such as, for example, audio content, video content, audio-video content, images, animations, slideshows, interactive gaming media, low-latency applications such as gambling applications, or the like and/or may include remote data content such as, for example, textual data, textual information, or the like. The user device 102 may receive remote multimedia content via streaming, which may include real-time reception and rendering of the remote multimedia content on the user device 120 and/or on a device associated with the user device 120. As such, streaming may enable low-latency, instantaneous distribution and reception of the remote multimedia content. Local content may include local multimedia content and/or local data content. The local multimedia content may be similar to remote multimedia content and the local data content may be similar to the remote data content.

Upon authentication of the user device 102, the VSP control infrastructure may enable the user device 102 to establish a VPN connection with the VPN server 120, which may be an optimal VPN server for providing VPN services to the user device 102. In some aspects, the VPN server 120 may be the optimal server because, for example, because the VPN server 120 may be located geographically/physically closer (and therefore able to provide speedier service) to the user device 102 as compared to the other VPN servers, the VPN server 120 may have the highest available bandwidth to provide VPN services to the user device 102 as compared to the other VPN servers, and/or the VPN server 120 may be located geographically/physically closer to an international Internet exchange hub (and therefore able to provide speedier service) as compared to the other VPN servers.

To establish the VPN connection, the user device 102 may transmit, and the VPN server 120 may receive, an initiation request. Substantially simultaneously to receiving the initiation request, the VPN server 120 may receive remote content information. In some aspects, the remote content information may be included in the initiation request. In some aspects, the remote content information may be appended to a message including the initiation request. In some aspects, the remote content information and the initiation request may be received in separate communications. In some aspects, a client application installed on the user device 102 may enable the user device 102 to transmit the initiation request and the remote content information to the VPN server 120. The client application may include a graphical interface to accept remote content information via an input interface (e.g., touch screen, keyboard, mouse, pointer, etc.) associated with the user device 102. In some aspects, the client application may activate, at a time associated with transmitting the initiation request, the graphical interface for accepting remote content information. In some aspects, the graphical interface may present, for example, a pop-up menu on a screen associated with the user device 102 requesting entry of the remote content information via the input interface.

The remote content information may include information associated with the remote content that the user device 120 may receive. The remote content information may describe the remote content. In an example, the remote content information may indicate that the remote content is remote multimedia content (e.g., audio content, video content, audio-video content, etc.). In another example, the remote content information may identify a content provider of the remote content. For instance, the remote content information may indicate a domain name associated with the content provider. In yet another example, the remote content information may indicate a geographical location where the remote content is available.

Based at least in part on receiving the initiation request, the VPN server 120 may enable the user device 102 to establish a VPN connection with the VPN server 120. In some aspects, the VPN connection may be established using a VPN protocol such as, for example, proxy protocol v2, IP in IP (Protocol 4): IP in IPv4/IPv6; SIT/IPv6 (Protocol 41): IPv6 in IPv4/IPv6; GRE (Protocol 47): Generic Routing Encapsulation; OpenVPN (UDP port 1194); SSTP (TCP port 443): Secure Socket Tunneling Protocol; IPSec (Protocol 50 and 51): Internet Protocol Security; L2TP (Protocol 115): Layer 2 Tunneling Protocol; VXLAN (UDP port 4789): Virtual Extensible Local Area Network; WireGuard; Quic, and other available data communication protocols and their future iterations.

Further, based at least in part on the remote content information, the VPN server 120 may configure the VPN connection to be associated with one or more remote DNS servers 220 that may enable the VPN server 120 to reach an exchange point capable of obtaining the remote content. For instance, the VPN server 120 may configure the VPN connection to be associated with the one or more remote DNS servers 220 that can provide access IP addresses of exchange points (e.g., exchange point 240) capable of obtaining the remote content. In some aspects, such exchange points may be located in a geographic location where the remote content is available.

In some aspects, the one or more remote DNS servers 220 may have respective predetermined lists of exchange points for whom the one or more remote DNS servers 220 are capable of providing access IP addresses. The VPN server 120 may evaluate such predetermined lists to determine exchange points capable of obtaining the remote content to be received by the user device 102 and, therefore, select the one or more remote DNS servers 220 with which to associate the VPN connection. Such one or more remote DNS servers 220 may be separate from the default DNS server 210.

In an example, when a user device 102 located in a first geographical location (e.g., Sweden) transmits remote content information indicating that remote content available in a second geographical location (e.g., United States) may be received, the VPN server 120, which may be located in or near the first geographical location, may configure the VPN connection to be associated with one or more remote DNS servers 220 that can provide access IP addresses of exchange points located in or near the second geographical location where the remote content is available. The VPN server 120 may evaluate respective predetermined lists of exchange points associated with the one or more remote DNS servers 220 to determine exchange points located in or near the second geographical location (e.g., capable of obtaining the remote content) and, therefore, the one or more remote DNS servers 220 with which to associate the VPN connection.

Further, the VPN server 120 may configure DNS settings associated with the VPN connection such that when a remote content request for the remote content is received from the user device 102 during the VPN connection (e.g., after the VPN connection is established), the VPN server 120 may utilize the one or more remote DNS servers 220 to receive an access IP address for an exchange point (e.g., exchange point 240) located in or near the second geographical location where the remote content is available. In some aspects, the VPN server 120 may transmit at least a portion of the remote content information to the one or more remote DNS servers 220 to enable the one or more remote DNS servers 220 to provide an access IP address associated with the exchange point. In some aspects, the exchange point located in or near the second geographical location may utilize a proxy IP address associated with a proxy device (e.g., a laptop computer, a desktop computer, a smart phone, a tablet computer, or the like) that is also located in or near the second geographical location. As a result, the content provider may agree to provide the remote content to the exchange point based at least in part on evaluating the proxy IP address and determining that the exchange point is located in or near the second geographical location where the remote content is available. In this way, the VPN server 120 may enable the user device 102, that is located in the first geographical location where the remote content is unavailable, to receive the remote content via the exchange point located in or near the second geographical location where the remote content is available.

During the VPN connection, the VPN server 120 may receive a remote content request for the remote content. Based at least in part on receiving the remote content request, the VPN server 120 may communicate (e.g., transmit and/or receive) with the one or more remote DNS servers 220 to receive an access IP address associated with, for example, exchange point 240 (e.g., remote exchange point) that is located in a geographical location where the remote content is available. Based at least in part on receiving the access IP address associated with the exchange point 240, the VPN server 120 may transmit at least a portion of the remote content information and/or the remote content request to the exchange point 240. The exchange point 240 may utilize a proxy IP address associated with a proxy device that is also located in the geographical location where the remote content is available to obtain the remote content. Based at least in part on obtaining the remote content, the exchange point 240 may transmit, and the VPN server 120 may receive, the remote content. Based at least in part on receiving the remote content from the exchange point 240, the VPN server 120 may provide the remote content to the user device 102 via the VPN connection.

During the VPN connection, the VPN server 120 may also receive a local content request including local content information for requesting local content. In some aspects, the VPN server 120 may receive the local content request substantially simultaneously with the remote content request. In some aspects, the VPN server may receive the local content request at a different time with respect to the remote content request. Based at least in part on receiving the local content request and/or determining that the local content request is associated with local content, the VPN server 120 may select to utilize the default DNS server 210 to receive an access IP address associated with, for example, exchange point 230 (e.g., local exchange point) that is capable of obtaining the local content. Based at least in part on receiving the access IP address associated with the exchange point 230, the VPN server 120 may transmit at least a portion of the local content information and/or the local content request to the exchange point 230. The exchange point 230 may utilize a proxy IP address associated with a proxy device that is also located in the geographical location where the local content is available to obtain the local content. Based at least in part on obtaining the local content, the exchange point 230 may transmit, and the VPN server 120 may receive, the local content. Based at least in part on receiving the local content from the exchange point 230, the VPN server 120 may provide the local content to the user device 102 via the VPN connection.

In this way, by providing a split-configuration to utilize a remote DNS server to service remote content requests requesting remote content and a default DNS server to service local content requests requesting local content, a VPN server may enable a user device located in a geographical location, where the remote content is unavailable, to receive the remote content via the VPN connection. Additionally, the VPN server may provide the remote content to a user device without the user device disconnecting an established VPN connection with the VPN server and establishing a new VPN connection with a new VPN server. As a result, efficient consumption of user device resources and resources associated with the VPN may be enabled. Additionally, because the VPN server may be an optimal VPN server to provide VPN services to the user device, the user device may receive speedier service as compared to the new VPN server. Also, overloading of a VPN server (e.g., new VPN server) that is capable of providing the remote content may be avoided, thereby conserving resources associated with the VPN.

As indicated above, FIG. 2 is provided as an example. Other examples may differ from what is described with regard to FIG. 2.

FIG. 3 is an illustration of an example flow 300 associated with providing a split-configuration VPN, according to various aspects of the present disclosure. The example flow 300 may include a user device 102 in communication with a VPN server 120. In some aspects, as discussed elsewhere herein, a VSP control infrastructure associated with the VPN server 120 may configure the VPN server 120 to provide VPN services to the user device 102.

As shown by reference numeral 310, upon authentication of the user device 102, the VPN server 120 may receive an initiation request and/or remote content information to establish a VPN connection, as discussed elsewhere herein. Based at least in part on receiving the initiation request and/or the remote content information, as shown by reference numeral 320, the VPN server 120 may establish and configure the VPN connection. In some aspects, as discussed elsewhere herein, configuring the VPN connection may include associating the VPN connection with one or more remote DNS servers (e.g., remote DNS server 220) that may enable the VPN server 120 to reach an exchange point (e.g., exchange point 240) capable of obtaining the remote content. Further, as discussed elsewhere herein, configuring the VPN connection may include configuring DNS settings associated with the VPN connection such that when a remote content request for the remote content is received from the user device 102 during the VPN connection (e.g., after the VPN connection is established), the VPN server 120 may utilize the one or more remote DNS servers 220 to receive an access IP address for the exchange point capable of obtaining the remote content.

During the VPN connection, as shown by reference numeral 330, the VPN server 120 may receive a remote content request for the remote content. As shown by reference numeral 340, the VPN server 120 may receive the remote content by communicating with the exchange point capable of obtaining the remote content, as discussed elsewhere herein. Based at least in part on receiving the remote content, as shown by reference number 350, the VPN server 120 may provide the remote content to the user device 102 via the VPN connection as discussed elsewhere herein.

During the VPN connection, as shown by reference numeral 360, the VPN server 120 may receive a local content request for the local content. As shown by reference numeral 370, the VPN server 120 may receive the local content by communicating with the exchange point capable of obtaining the local content, as discussed elsewhere herein. Based at least in part on receiving the local content, as shown by reference number 380, the VPN server 120 may provide the local content to the user device 102 via the VPN connection as discussed elsewhere herein.

As indicated above, FIG. 3 is provided as an example. Other examples may differ from what is described with regard to FIG. 3.

FIG. 4 is an illustration of an example process 400 associated with providing a split-configuration VPN, according to various aspects of the present disclosure. In some aspects, the process 400 may be performed by a memory (e.g., memory 730) and/or a processor (e.g., processor 720) associated with a VPN server (e.g., VPN server 120). As shown by reference numeral 410, process 400 may include receiving, at a VPN server, an initiation request from a user device to establish a VPN connection with the VPN server, the initiation request including remote content information associated with remote content. For instance, the VPN server may utilize a communication interface (e.g., communication interface 770) and the associated memory and/or processor to receive an initiation request from a user device to establish a VPN connection with the VPN server, the initiation request including remote content information associated with remote content, as discussed elsewhere herein.

As shown by reference numeral 420, process 400 may include transmitting at least a portion of the remote content information to a remote domain name services (DNS) server to enable the remote DNS server to provide an access internet protocol (IP) address associated with a first exchange point that is capable of obtaining the remote content. For instance, the VPN server may utilize the communication interface (e.g., communication interface 770) and the associated memory and/or processor to transmit at least a portion of the remote content information to a remote domain name services (DNS) server to enable the remote DNS server to provide an access internet protocol (IP) address associated with a first exchange point that is capable of obtaining the remote content, as discussed elsewhere herein.

Process 400 may include additional aspects, such as any single aspect or any combination of aspects described below and/or in connection with one or more other processes described elsewhere herein.

In a first aspect, process 400 may include selecting the remote DNS server based at least in part on an association of the remote DNS server with the first exchange point that is capable of obtaining the remote content.

In a second aspect, alone or in combination with the first aspect, process 400 may include selecting the remote DNS server based at least in part on determining that the remote DNS server can provide the access IP address of the first exchange point.

In a third aspect, alone or in combination with the first through second aspects, process 400 may include receiving, from the remote DNS server, the access IP address associated with the first exchange point based at least in part on transmitting at least a portion of the remote content information to the remote DNS server.

In a fourth aspect, alone or in combination with the first through third aspects, process 400 may include receiving, during the VPN connection, a remote content request for the remote content; transmitting information associated with the remote content request to the first exchange point; receiving the remote content from the first exchange point; and transmitting the remote content to the user device.

In a fifth aspect, alone or in combination with the first through fourth aspects, in process 400, the remote content information indicates a geographical location where the remote content is available.

In a sixth aspect, alone or in combination with the first through fifth aspects, process 400 may include receiving, during the VPN connection, a local content request for the local content; transmitting information associated with the local content request to a second exchange point; receiving the local content from the second exchange point; and transmitting the local content to the user device.

Although FIG. 4 shows example blocks of the process, in some aspects, the process may include additional blocks, fewer blocks, different blocks, or differently arranged blocks than those depicted in FIG. 4. Additionally, or alternatively, two or more of the blocks of the process may be performed in parallel.

As indicated above, FIG. 4 is provided as an example. Other examples may differ from what is described with regard to FIG. 4.

FIG. 5 is an illustration of an example process 500 associated with providing a split-configuration VPN, according to various aspects of the present disclosure. In some aspects, the process 500 may be performed by a memory (e.g., memory 730) and/or a processor (e.g., processor 720) associated with a VPN server (e.g., VPN server 120). As shown by reference numeral 510, process 500 may include receiving, during a VPN connection, a local content request requesting local content. For instance, the VPN server may utilize a communication interface (e.g., communication interface 770) and the associated memory and/or processor to receive, during a VPN connection, a local content request requesting local content, as discussed elsewhere herein.

As shown by reference numeral 520, process 500 may include transmitting, to a local exchange point that is capable of obtaining the local content, at least a portion of the local content request to enable the local exchange point to provide the local content. For instance, the VPN server may utilize the communication interface (e.g., communication interface 770) and the associated memory and/or processor to transmit, to a local exchange point that is capable of obtaining the local content, at least a portion of the local content request to enable the local exchange point to provide the local content, as discussed elsewhere herein.

As shown by reference numeral 530, process 500 may include receiving, during the VPN connection, a remote content request requesting remote content. For instance, the VPN server may utilize the communication interface (e.g., communication interface 770) and the associated memory and/or processor to receive, during the VPN connection, a remote content request requesting remote content, as discussed elsewhere herein.

As shown by reference numeral 540, process 500 may include receiving, during the VPN connection, a remote content request requesting remote content. For instance, the VPN server may utilize the communication interface (e.g., communication interface 770) and the associated memory and/or processor to transmit, to a remote exchange point that is capable of obtaining the remote content, at least a portion of the remote content request to enable the remote exchange point to provide the remote content, as discussed elsewhere herein.

Process 500 may include additional aspects, such as any single aspect or any combination of aspects described below and/or in connection with one or more other processes described elsewhere herein.

In a first aspect, in process 500, the local content request and the remote content request are received substantially simultaneously.

In a second aspect, alone or in combination with the first aspect, process 500 may include receiving, prior to establishment of the VPN connection, remote content information associated with the remote content.

In a third aspect, alone or in combination with the first through second aspects, process 500 may include selecting, based at least in part on remote content information received prior to establishment of the VPN connection, a domain name services (DNS) server to provide an access internet protocol (IP) address associated with the remote exchange point.

In a fourth aspect, alone or in combination with the first through third aspects, process 500 may include transmitting, to a remote domain name services (DNS) server, at least a portion of remote content information received prior to establishment of the VPN connection; and receiving, from the remote DNS server, an access internet protocol (IP) address associated with the remote exchange point, wherein transmitting at least the portion of the remote content request includes transmitting at least the portion of the remote content request using the IP address associated with the remote exchange point.

In a fifth aspect, alone or in combination with the first through fourth aspects, process 500 may include receiving, from the local exchange point, the local content based at least in part on transmitting at least the portion of the local content request to the local exchange point; and transmitting the local content to a user device.

In a sixth aspect, alone or in combination with the first through fifth aspects, process 500 may include receiving, during the VPN connection, a local content request for the local content; transmitting information associated with the local content request to a second exchange point; receiving the local content from the second exchange point; and transmitting the local content to the user device.

Although FIG. 5 shows example blocks of the process, in some aspects, the process may include additional blocks, fewer blocks, different blocks, or differently arranged blocks than those depicted in FIG. 5. Additionally, or alternatively, two or more of the blocks of the process may be performed in parallel.

As indicated above, FIG. 5 is provided as an example. Other examples may differ from what is described with regard to FIG. 5.

FIG. 6 is an illustration of an example process 600 associated with providing a split-configuration VPN, according to various aspects of the present disclosure. In some aspects, the process 600 may be performed by a memory (e.g., memory 730) and/or a processor (e.g., processor 720, processing unit 110, etc.) associated with a VSP control infrastructure (e.g., VSP control infrastructure 104). As shown by reference numeral 610, process 600 may include configuring a VPN server to receive, during a VPN connection, a local content request requesting local content. For instance, the VSP control infrastructure may utilize an associated memory and/or a processor to configure a VPN server to receive, during a VPN connection, a local content request requesting local content, as discussed elsewhere herein.

As shown by reference numeral 620, process 600 may include configuring the VPN server to transmit, to a local exchange point that is capable of obtaining the local content, at least a portion of the local content request to enable the local exchange point to provide the local content. For instance, the VPN server may utilize the associated memory and/or processor to configure the VPN server to transmit, to a local exchange point that is capable of obtaining the local content, at least a portion of the local content request to enable the local exchange point to provide the local content, as discussed elsewhere herein.

As shown by reference numeral 630, process 600 may include configuring the VPN server to receive, during the VPN connection, a remote content request requesting remote content. For instance, the VPN server may utilize the associated memory and/or processor to configure configuring the VPN server to receive, during the VPN connection, a remote content request requesting remote content, as discussed elsewhere herein.

As shown by reference numeral 640, process 600 may include configuring the VPN server to transmit, to a remote exchange point that is capable of obtaining the remote content, at least a portion of the remote content request to enable the remote exchange point to provide the remote content. For instance, the VPN server may utilize the associated memory and/or processor to configure the VPN server to transmit, to a remote exchange point that is capable of obtaining the remote content, at least a portion of the remote content request to enable the remote exchange point to provide the remote content, as discussed elsewhere herein.

Process 600 may include additional aspects, such as any single aspect or any combination of aspects described below and/or in connection with one or more other processes described elsewhere herein.

In a first aspect, process 600 includes configuring the VPN server to receive the local content request and the remote content request substantially simultaneously.

In a second aspect, alone or in combination with the first aspect, process 600 includes configuring the VPN server to receive, prior to establishment of the VPN connection, remote content information associated with the remote content.

In a third aspect, alone or in combination with the first through second aspects, process 600 includes configuring the VPN server to select, based at least in part on remote content information received prior to establishment of the VPN connection, a domain name services (DNS) server to provide an access internet protocol (IP) address associated with the remote exchange point.

In a fourth aspect, alone or in combination with the first through third aspects, process 600 includes configuring the VPN server to transmit, to a remote domain name services (DNS) server, at least a portion of remote content information received prior to establishment of the VPN connection; and configuring the VPN server to receive, from the remote DNS server, an access internet protocol (IP) address associated with the remote exchange point, wherein configuring the VPN server to transmit at least the portion of the remote content request includes configuring the VPN server to transmit at least the portion of the remote content request using the IP address associated with the remote exchange point.

In a fifth aspect, alone or in combination with the first through fourth aspects, process 600 includes configuring the VPN server to receive, from the remote exchange point, the remote content based at least in part on transmitting at least the portion of the remote content request to the remote exchange point; and configuring the VPN server to transmit the remote content to a user device.

In a sixth aspect, alone or in combination with the first through fifth aspects, process 600 includes configuring the VPN server to receive, from the local exchange point, the local content based at least in part on transmitting at least the portion of the local content request to the local exchange point; and configuring the VPN server to transmit the local content to a user device.

Although FIG. 6 shows example blocks of the process, in some aspects, the process may include additional blocks, fewer blocks, different blocks, or differently arranged blocks than those depicted in FIG. 6. Additionally, or alternatively, two or more of the blocks of the process may be performed in parallel.

As indicated above, FIG. 6 is provided as an example. Other examples may differ from what is described with regard to FIG. 6.

FIG. 7 is an illustration of example devices 700, according to various aspects of the present disclosure. In some aspects, the example devices 700 may form part of or implement the systems, servers, environments, infrastructures, components, devices, or the like described elsewhere herein (e.g., VSP control infrastructure, VPN server, etc.). The example devices 700 may include a universal bus 710 communicatively coupling a processor 720, a memory 730, a storage component 740, an input component 750, an output component 760, and a communication interface 770.

Bus 710 may include a component that permits communication among multiple components of a device 700. Processor 720 may be implemented in hardware, firmware, and/or a combination of hardware and software. Processor 720 may take the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some aspects, processor 720 may include one or more processors capable of being programmed to perform a function. Memory 730 may include a random access memory (RAM), a read only memory (ROM), and/or another type of dynamic or static storage device (e.g., a flash memory, a magnetic memory, and/or an optical memory) that stores information and/or instructions for use by processor 720.

Storage component 740 may store information and/or software related to the operation and use of a device 700. For example, storage component 740 may include a hard disk (e.g., a magnetic disk, an optical disk, and/or a magneto-optic disk), a solid state drive (SSD), a compact disc (CD), a digital versatile disc (DVD), a floppy disk, a cartridge, a magnetic tape, and/or another type of non-transitory computer-readable medium, along with a corresponding drive.

Input component 750 may include a component that permits a device 700 to receive information, such as via user input (e.g., a touch screen display, a keyboard, a keypad, a mouse, a button, a switch, and/or a microphone). Additionally, or alternatively, input component 750 may include a component for determining location (e.g., a global positioning system (GPS) component) and/or a sensor (e.g., an accelerometer, a gyroscope, an actuator, another type of positional or environmental sensor, and/or the like). Output component 760 may include a component that provides output information from device 700 (via, for example, a display, a speaker, a haptic feedback component, an audio or visual indicator, and/or the like).

Communication interface 770 may include a transceiver-like component (e.g., a transceiver, a separate receiver, a separate transmitter, and/or the like) that enables a device 700 to communicate with other devices, such as via a wired connection, a wireless connection, or a combination of wired and wireless connections. Communication interface 770 may permit device 700 to receive information from another device and/or provide information to another device. For example, communication interface 770 may include an Ethernet interface, an optical interface, a coaxial interface, an infrared interface, a radio frequency (RF) interface, a universal serial bus (USB) interface, a Wi-Fi interface, a cellular network interface, and/or the like.

A device 700 may perform one or more processes described elsewhere herein. A device 700 may perform these processes based on processor 720 executing software instructions stored by a non-transitory computer-readable medium, such as memory 730 and/or storage component 740. As used herein, the term "computer-readable medium" may refer to a non-transitory memory device. A memory device may include memory space within a single physical storage device or memory space spread across multiple physical storage devices.

Software instructions may be read into memory 730 and/or storage component 740 from another computer-readable medium or from another device via communication interface 770. When executed, software instructions stored in memory 730 and/or storage component 740 may cause processor 720 to perform one or more processes described elsewhere herein. Additionally, or alternatively, hardware circuitry may be used in place of or in combination with software instructions to perform one or more processes described elsewhere herein. Thus, implementations described herein are not limited to any specific combination of hardware circuitry and software.

The quantity and arrangement of components shown in FIG. 7 are provided as an example. In practice, a device 700 may include additional components, fewer components, different components, or differently arranged components than those shown in FIG. 7. Additionally, or alternatively, a set of components (e.g., one or more components) of a device 700 may perform one or more functions described as being performed by another set of components of a device 700.

As indicated above, FIG. 7 is provided as an example. Other examples may differ from what is described with regard to FIG. 7.

Persons of ordinary skill in the art will appreciate that the aspects encompassed by the present disclosure are not limited to the particular exemplary aspects described herein. In that regard, although illustrative aspects have been shown and described, a wide range of modification, change, and substitution is contemplated in the foregoing disclosure. It is understood that such variations may be made to the aspects without departing from the scope of the present disclosure. Accordingly, it is appropriate that the appended claims be construed broadly and in a manner consistent with the present disclosure.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" or "device" is intended to be broadly construed as hardware, firmware, or a combination of hardware and software. As used herein, a processor is implemented in hardware, firmware, or a combination of hardware and software.

As used herein, satisfying a threshold may, depending on the context, refer to a value being greater than the threshold, greater than or equal to the threshold, less than the threshold, less than or equal to the threshold, equal to the threshold, or not equal to the threshold, among other examples, or combinations thereof.

It will be apparent that systems or methods described herein may be implemented in different forms of hardware, firmware, or a combination of hardware and software. The actual specialized control hardware or software code used to implement these systems or methods is not limiting of the aspects. Thus, the operation and behavior of the systems or methods were described herein without reference to specific software code—it being understood that software and hardware can be designed to implement the systems or methods based, at least in part, on the description herein.

Even though particular combinations of features are recited in the claims or disclosed in the specification, these combinations are not intended to limit the disclosure of various aspects. In fact, many of these features may be combined in ways not specifically recited in the claims or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method associated with a split-configuration virtual private network (VPN), the method comprising:
   receiving, by a VPN server from a user device prior to establishment of a VPN connection between the VPN server and the user device, an initiation request to establish the VPN connection, the initiation request including remote content information indicating remote content that is to be requested by the user device after the VPN connection is established, the remote content being unavailable in a geographic location of the user device; and
   configuring, by the VPN server based at least in part on the remote content information, domain name services (DNS) settings associated with the VPN connection to associate the VPN connection with a remote DNS server that is capable of enabling the VPN server to obtain the remote content after establishment of the VPN connection.

2. The method of claim 1, further comprising:
selecting, by the VPN server, the remote DNS server based at least in part on an association of the remote DNS server with an exchange point located in a location where the remote content is available.

3. The method of claim 1, further comprising:
selecting, by the VPN server, the remote DNS server based at least in part on determining that the remote DNS server can provide an access IP address of an exchange point capable of enabling the VPN server to obtain the remote content.

4. The method of claim 1, further comprising:
configuring, by the VPN server, the DNS settings associated with the VPN connection to be associated with a local DNS server that is capable of enabling the VPN server to obtain local content that is available in the geographic location of the user device.

5. The method of claim 1, further comprising:
receiving, by the VPN server from the remote DNS server, an access IP address of an exchange point capable of enabling the VPN server to obtain the remote content; and
transmitting, by the VPN server to the exchange point based at least in part on utilizing the access IP address, a request to receive the remote content.

6. The method of claim 1, further comprising:
receiving, by the VPN server from the user device after establishment of the VPN connection, a local content request for local content that is available in the geographic location of the user device; and
transmitting, by the VPN server to the user device, the local content that is obtained based at least in part on utilizing a local DNS server.

7. The method of claim 1, wherein the remote content information indicates a geographical location where the remote content is available.

8. A virtual private network (VPN) server, comprising:
a memory; and
a processor communicatively coupled to the memory, the memory and the processor being configured to:
receive, from a user device prior to establishment of a VPN connection between the VPN server and the user device, an initiation request to establish the VPN connection, the initiation request including remote content information indicating remote content that is to be requested by the user device after the VPN connection is established, the remote content being unavailable in a geographic location of the user device; and
configure, based at least in part on the remote content information, domain name services (DNS) settings associated with the VPN connection to associate the VPN connection with a remote DNS server that is capable of enabling the VPN server to obtain the remote content after establishment of the VPN connection.

9. The device of claim 8, wherein the memory and the processor are configured to select the remote DNS server based at least in part on an association of the remote DNS server with an exchange point located in a location where the remote content is available.

10. The device of claim 8, wherein the memory and the processor are configured to select the remote DNS server based at least in part on determining that the remote DNS server can provide an access IP address of an exchange point capable of enabling the VPN server to obtain the remote content.

11. The device of claim 8, wherein the memory and the processor are configured to configure the DNS settings associated with the VPN connection to be associated with a local DNS server that is capable of enabling the VPN server to obtain local content that is available in the geographic location of the user device.

12. The device of claim 8, wherein the memory and the processor are configured to:
receive, from the remote DNS server, an access IP address of an exchange point capable of enabling the VPN server to obtain the remote content; and
transmit, to the exchange point based at least in part on utilizing the access IP address, a request to receive the remote content.

13. The device of claim 8, wherein the memory and the processor are configured to:
receive, from the user device after establishment of the VPN connection, a local content request for local content that is available in the geographic location of the user device; and
transmit, to the user device, the local content that is obtained based at least in part on utilizing a local DNS server.

14. The device of claim 8, wherein the remote content information indicates a geographical location where the remote content is available.

15. A non-transitory computer-readable medium configured to store instructions, which when executed by a processor associated with a virtual private network (VPN) server, configure the processor to:
receive, from a user device prior to establishment of a VPN connection between the VPN server and the user device, an initiation request to establish the VPN connection, the initiation request including remote content information indicating remote content that is to be requested by the user device after the VPN connection is established, the remote content being unavailable in a geographic location of the user device; and
configure, based at least in part on the remote content information, domain name services (DNS) settings associated with the VPN connection to associate the VPN connection with a remote DNS server that is capable of enabling the VPN server to obtain the remote content after establishment of the VPN connection.

16. The non-transitory computer-readable medium of claim 15, wherein the processor is configured to select the remote DNS server based at least in part on an association of the remote DNS server with an exchange point located in a location where the remote content is available.

17. The non-transitory computer-readable medium of claim 15, wherein, the processor is configured to select the remote DNS server based at least in part on determining that the remote DNS server can provide an access IP address of an exchange point capable of enabling the VPN server to obtain the remote content.

18. The non-transitory computer-readable medium of claim 15, wherein the processor is configured to configure the DNS settings associated with the VPN connection to be associated with a local DNS server that is capable of enabling the VPN server to obtain local content that is available in the geographic location of the user device.

19. The non-transitory computer-readable medium of claim 15, wherein the processor is configured to:
receive, from the remote DNS server, an access IP address of an exchange point capable of enabling the VPN server to obtain the remote content; and transmit, to the exchange point based at least in part on utilizing the access IP address, a request to receive the remote content.

20. The non-transitory computer-readable medium of claim 15, wherein the processor is configured to:

receive, from the user device after establishment of the VPN connection, a local content request for local content that is available in the geographic location of the user device; and transmit, to the user device, the local content that is obtained based at least in part on utilizing a local DNS server.

* * * * *